United States Patent
Lyu et al.

(10) Patent No.: US 12,480,707 B2
(45) Date of Patent: Nov. 25, 2025

(54) VERTICAL BEAM ASSEMBLY FOR REFRIGERATOR DOOR AND REFRIGERATOR

(71) Applicants: QINGDAO HAIER REFRIGERATOR CO., LTD., Shandong (CN); HAIER SMART HOME CO., LTD., Shandong (CN)

(72) Inventors: Peng Lyu, Shandong (CN); Hao Zhang, Shandong (CN); Zhenxing Zhang, Shandong (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 94 days.

(21) Appl. No.: 18/575,784

(22) PCT Filed: May 27, 2022

(86) PCT No.: PCT/CN2022/095662
§ 371 (c)(1),
(2) Date: Dec. 29, 2023

(87) PCT Pub. No.: WO2023/273741
PCT Pub. Date: Jan. 5, 2023

(65) Prior Publication Data
US 2024/0369285 A1  Nov. 7, 2024

(30) Foreign Application Priority Data
Jun. 30, 2021 (CN) .......................... 202110738428.6

(51) Int. Cl.
*F25D 23/02* (2006.01)

(52) U.S. Cl.
CPC ...... *F25D 23/028* (2013.01); *F25D 2323/024* (2013.01)

(58) Field of Classification Search
CPC .. F25D 23/028; F25D 2323/024; F25D 23/02; F25D 23/00; F25D 11/00
See application file for complete search history.

(56) References Cited

U.S. PATENT DOCUMENTS

| 7,008,032 B2 * | 3/2006 | Chekal ............... F25D 23/02 49/316 |
| 8,167,389 B2 * | 5/2012 | Han ................. F25D 23/02 312/405 |

(Continued)

FOREIGN PATENT DOCUMENTS

| CN | 102213512 A | 10/2011 | |
| CN | 104279823 A * | 1/2015 | ........... F25D 23/028 |

(Continued)

*Primary Examiner* — Hanh V Tran
(74) *Attorney, Agent, or Firm* — MUNCY, GEISSLER, OLDS & LOWE, P.C.

(57) ABSTRACT

A vertical beam assembly for a refrigerator door, comprising: a vertical beam body, comprises a base shell and a cover plate, the cover plate is provided over the base shell to form a foaming space for filling with foaming material; wherein the base shell provides multiple receptacle cavities along a longitudinal direction near the side of the refrigerator door, multiple sealing covers are provided at the multiple receptacle cavities facing the cover plate side and one-to-one correspondence with the multiple receptacle cavities, sealing the openings from the receptacle cavities leading to the foaming space; and a hinge assembly, comprises multiple hinges mounted within the receptacle cavities respectively, to rotatably connect the vertical beam body to the refrigerator door.

9 Claims, 11 Drawing Sheets

(56) References Cited

U.S. PATENT DOCUMENTS

| | | | | |
|---|---|---|---|---|
| 10,429,121 B2 * | 10/2019 | Yoon | ........................ | F25D 21/04 |
| 10,837,695 B2 * | 11/2020 | Baum | .................. | B67D 1/0857 |
| 2007/0138925 A1 | 6/2007 | Fu | | |
| 2020/0011591 A1 * | 1/2020 | Ham | ..................... | E05F 1/1207 |
| 2024/0183607 A1 * | 6/2024 | Zhao | ..................... | F25D 23/028 |
| 2024/0191935 A1 * | 6/2024 | Zhao | ..................... | F25D 23/028 |

FOREIGN PATENT DOCUMENTS

| | | | | | |
|---|---|---|---|---|---|
| CN | 204165315 U | * | 2/2015 | | |
| CN | 105352249 A | | 2/2016 | | |
| CN | 105466130 A | * | 4/2016 | | |
| CN | 106052275 A | * | 10/2016 | | |
| CN | 106352651 A | | 1/2017 | | |
| CN | 106855332 A | * | 6/2017 | .............. | F25D 11/00 |
| CN | 107024069 A | * | 8/2017 | .............. | F25D 11/00 |
| CN | 206600959 U | * | 10/2017 | | |
| CN | 107421224 A | * | 12/2017 | ............. | F25D 23/02 |
| CN | 107477950 A | * | 12/2017 | | |
| CN | 107664374 A | * | 2/2018 | ............. | F25D 11/00 |
| CN | 105352249 B | * | 9/2018 | | |
| CN | 108562101 A | * | 9/2018 | | |
| CN | 109631460 A | * | 4/2019 | ............. | F25D 11/00 |
| CN | 106352651 B | * | 8/2019 | ......... | F25D 23/028 |
| CN | 111503967 A | * | 8/2020 | ............. | F25D 11/02 |
| CN | 215892927 U | | 2/2022 | | |
| CN | 216409462 U | | 4/2022 | | |
| EP | 2741034 B1 | * | 6/2020 | ............... | E06B 7/18 |
| KR | 101522186 B1 | * | 5/2015 | | |
| KR | 20190086844 A | * | 7/2019 | | |
| KR | 102177017 B1 | * | 11/2020 | | |
| KR | 20210036216 A | * | 4/2021 | | |
| WO | WO-2017039295 A1 | * | 3/2017 | ............. | F21V 33/00 |
| WO | WO-2018181439 A1 | * | 10/2018 | ............. | F25D 21/04 |
| WO | WO-2020073789 A1 | * | 4/2020 | ......... | F25D 23/028 |
| WO | WO-2020126471 A1 | | 6/2020 | | |

* cited by examiner

VERTICAL BEAM ASSEMBLY FOR REFRIGERATOR DOOR AND REFRIGERATOR

TECHNICAL FIELD

The present invention relates to the technical field of home appliances, and in particular relates to a vertical beam assembly for refrigerator door and a refrigerator.

BACKGROUND

In existing technology, refrigerator with side-by-side doors, such as refrigerator with French doors, generally these doors are provided at the opening of the refrigerating compartment only, while the freezing compartment usually adopts a drawer-type structure. However, the drawer structure in the freezing compartment is prone to deformation due to long-term pressure, leading to difficulties in closing the drawer tightly. The drawer structure also limits the height of items that can be stored in the freezing compartment, significantly effecting the user experience.

Moreover, the refrigerator provides with side-by-side doors at the freezing compartment in existing technologies, a vertical beam is provided at the cabinet of the refrigerator for dividing the freezing compartment into two spaces. While this avoids degrading the user experience by using drawers to store items, it still limits the size of the items that can be stored, resulting in larger food items being unable to be stored in the freezing compartment. reducing the effective utilization of the storage space of the freezing compartment and effecting the user experience.

SUMMARY

An objective of the present invention is to provide a vertical beam assembly for refrigerator door and a refrigerator which solves the problems above or at least partially solves the problems above.

A further objective of the present invention is to provide a turnable vertical beam assembly for the freezing compartment to enhance the effective utilization of the storage space, thereby improving the user experience.

A further objective is to simplify the structure of the vertical beam assembly and further strengthen the construction of the vertical beam assembly.

Particularly, the present invention provides a vertical beam assembly for a refrigerator door, comprising:
 a vertical beam body, comprises a base shell and a cover plate, the cover plate is provided over the base shell to form a foaming space for filling with foaming material;
 wherein the base shell provides multiple receptacle cavities along a longitudinal direction near the side of the refrigerator door, multiple sealing covers are provided at the multiple receptacle cavities facing the cover plate side and one-to-one correspondence with the multiple receptacle cavities, sealing the openings from the receptacle cavities leading to the foaming space;
 a hinge assembly, comprises multiple hinges mounted within the receptacle cavities respectively, to rotatably connect the vertical beam body to the refrigerator door.

Furthermore, both ends of every receptacle cavity is provided with positioning portions respectively, and both ends of every sealing cover is provided with fixed parts corresponding to the positioning parts respectively, the positioning parts and the fixed parts are matched one-to-one for positioning and securing the multiple sealing covers.

Furthermore, one of the multiple receptacle cavities is provided with a through hole at one end for passing through a line leading to the interior of the vertical beam body, a sealing ring is provided at the through hole and connected between the sealing cover and the base shell, to seal the gap between the line and the through hole.

Furthermore, the multiple hinges comprise a limiting hinge, the limiting hinge comprising:
 a first pivot component, mounted within one receptacle cavity and passing through the side wall of the base shell to connect with the refrigerator door, where the lower end surface of the first pivot component forms a cam surface;
 a second pivot component is configured to slidably along the longitudinal direction of the vertical beam body below the first pivot component, the second pivot component is provided with an upper end surface that matches the cam surface of the first pivot component;
 a spring, one end abutting against the bottom surface of the second pivot component and the other end abutting against a contact portion provided within the receptacle cavity.

Furthermore, both sides of the cover plate extend towards the base shell forming multiple snap fasteners, and the side walls of the base shell are correspondingly provided with multiple protrusions, each of the snap fasteners and protrusions match one-to-one, securing the cover plate to the base shell.

Furthermore, the vertical beam assembly for a refrigerator door further comprising:
 two sealing components, each provided at both ends of the vertical beam body, and connected between the base shell and the cover plate, to seal the gap between the base shell and the cover plate.

Furthermore, the top end of the base shell is provided with a guiding groove for guiding the rotation of the vertical beam body, wherein the groove walls of the guiding groove are provided with rib plates spaced around their outer perimeter, the rib plates are connected to the side walls of the base shell, to enhance the strength of the vertical beam body.

Furthermore, the bottom end of the base shell is also provided with an injection hole for injecting the foaming material into the foaming space.

Furthermore, the vertical beam assembly for a refrigerator door further comprising:
 an end cover, configured to extendably provided at the bottom end of the base shell;
 an elastic component, provided between the base shell and the end cover, one end abutting against the end of the base shell, and the other end against the end cover.

The present invention also provides a refrigerator, comprising:
 the vertical beam assembly for a refrigerator door according to any one of above embodiments, where the vertical beam assembly is configured to be mounted on the door of the freezing compartment of the refrigerator.

The vertical beam assembly for a refrigerator door and the refrigerator of the present invention, by providing a vertical beam assembly installed in the freezing compartment, ensuring the compartment's seal while removing size restrictions on stored items, enhancing space utilization, and further improving the user experience.

Furthermore, the vertical beam assembly for a refrigerator door and the refrigerator of the present invention, the vertical beam body comprising a base shell and a cover plate, the cover plate is provided over the base shell to form a foaming space for insulating material, simplifying the structure and reducing production costs.

Furthermore, the vertical beam assembly for a refrigerator door and the refrigerator of the present invention, by providing multiple receptacle cavities arranged on the base shell of the vertical beam assembly, along with corresponding sealing covers to close the openings from the receptacle cavities to the foaming space. This design effectively prevents the foaming material from flowing into the receptacle cavities and interfering with the hinges installed within, thus ensuring the normal turnable of the vertical beam assembly.

Furthermore, the vertical beam assembly for a refrigerator door and the refrigerator of the present invention, by providing a limiting hinge arranged on the vertical beam assembly, which plays a role in limiting the turning of the assembly. This prevents the vertical beam assembly from burnable arbitrarily after the refrigerator door is opened, thereby ensuring the normal opening and closing of the refrigerator door.

Furthermore, the vertical beam assembly for a refrigerator door and the refrigerator of the present invention, by providing rib plates distributed at intervals around the outer perimeter of the groove walls in the guiding groove, and the rib plates are connected to the side walls of the base shell. This structure enhances the strength of the vertical beam assembly.

Furthermore, the vertical beam assembly for a refrigerator door and the refrigerator of the present invention, by providing an injection hole arranged at the bottom end of the base shell. This design ensures normal filling of the foaming material while also enhancing the aesthetic appearance of the vertical beam assembly.

Furthermore, the vertical beam assembly for a refrigerator door and the refrigerator of the present invention, by providing an extendable end cover at the bottom end of the base shell. The end cover not only conceals the injection hole, enhancing the assembly's aesthetic appeal, but also improves the seal between the vertical beam assembly and the refrigerator cabinet.

The foregoing and other objects, advantages and features of the present invention will become more apparent to those skilled in the art in the light of the following detailed description of specific embodiments of the present invention in conjunction with the accompanying figures.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In figures:

FIG. 3 is a schematic exploded view of an end cap and an elastic component in

FIG. 2.

DETAILED DESCRIPTION

Figure 1:
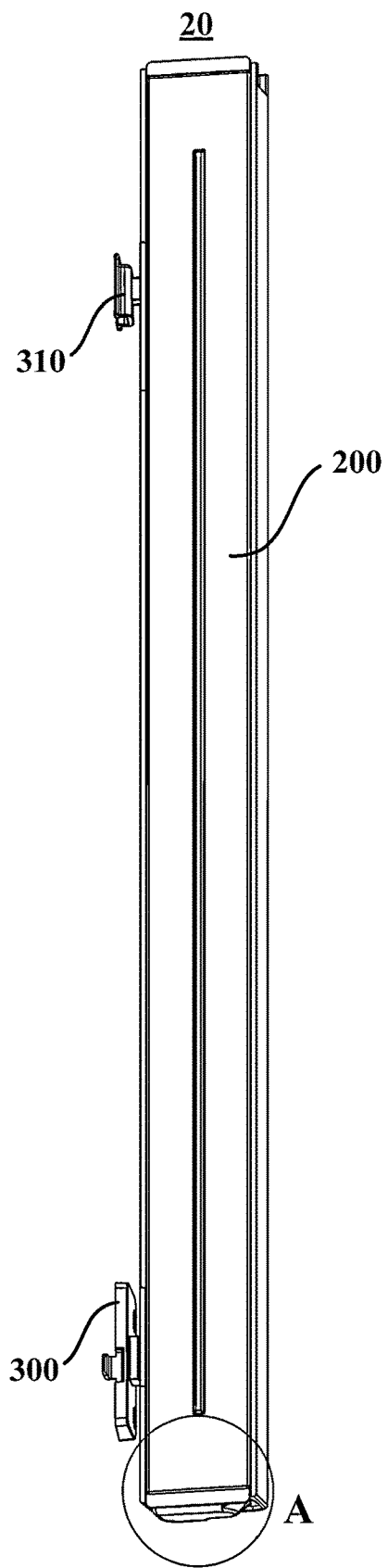
FIG. 1 is a schematic structural view of a vertical beam assembly for refrigerator door according to one embodiment of the present invention.

The specific embodiment of the present invention are described in detail below with reference to FIGS. 1-14. It should be noted that these embodiments do not limit the invention. Structural, methodological, or functional changes derived from these embodiments by those skilled in the art are included within the scope of the present invention.

In the description of the present embodiment, it is to be understood that the orientations or position relationships indicated by the terms "front", "rear", "left", "right", "top", "bottom" etc. are based on the orientation of the refrigerator in the normal use state as a reference, and may be determined with reference to the orientations or position relationships shown in the drawings, for example, "front" indicating the orientation refers to a side of the refrigerator facing a user. This is merely to facilitate a description of the present invention and to simplify the description, and is not to indicate or imply that the devices or elements referred to must have a particular orientation, or be constructed and operated in a particular orientation, and therefore should not be construed as limiting the present invention.

Figure 2:
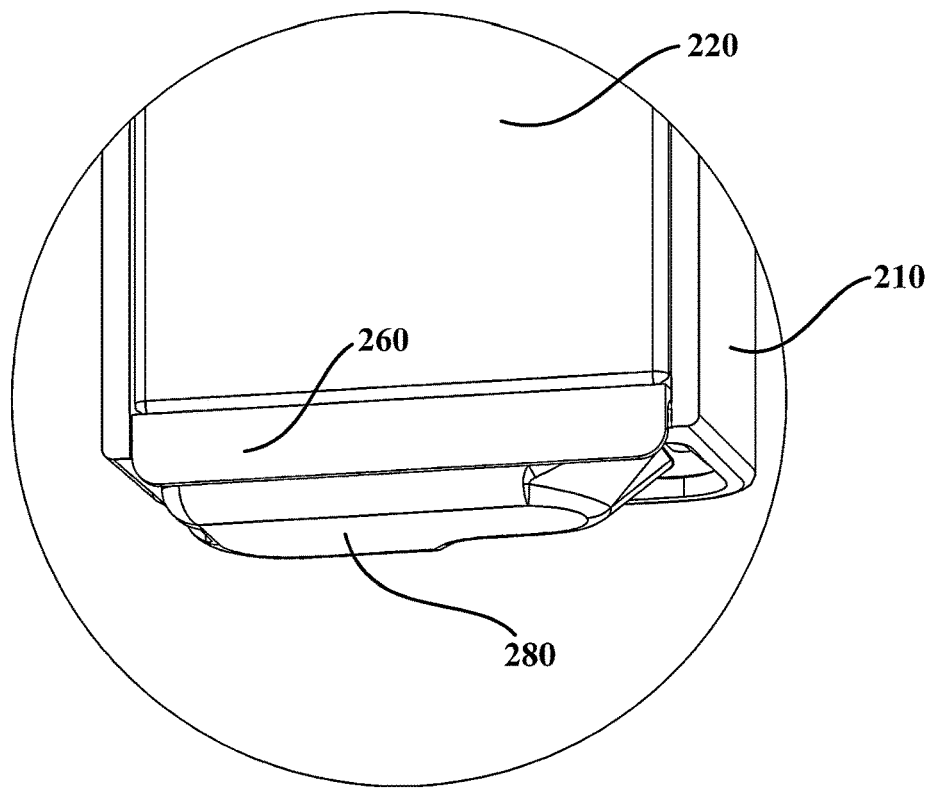
FIG. 2 is an enlarged view of a region A in FIG. 1.
Figure 3:
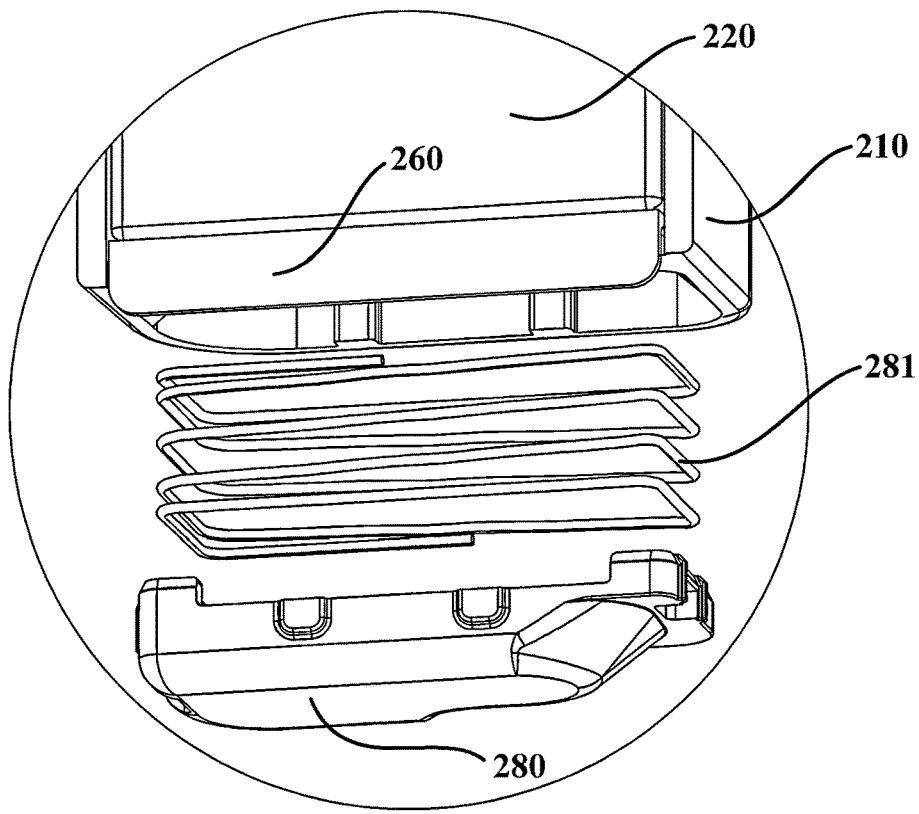
Figure 4:
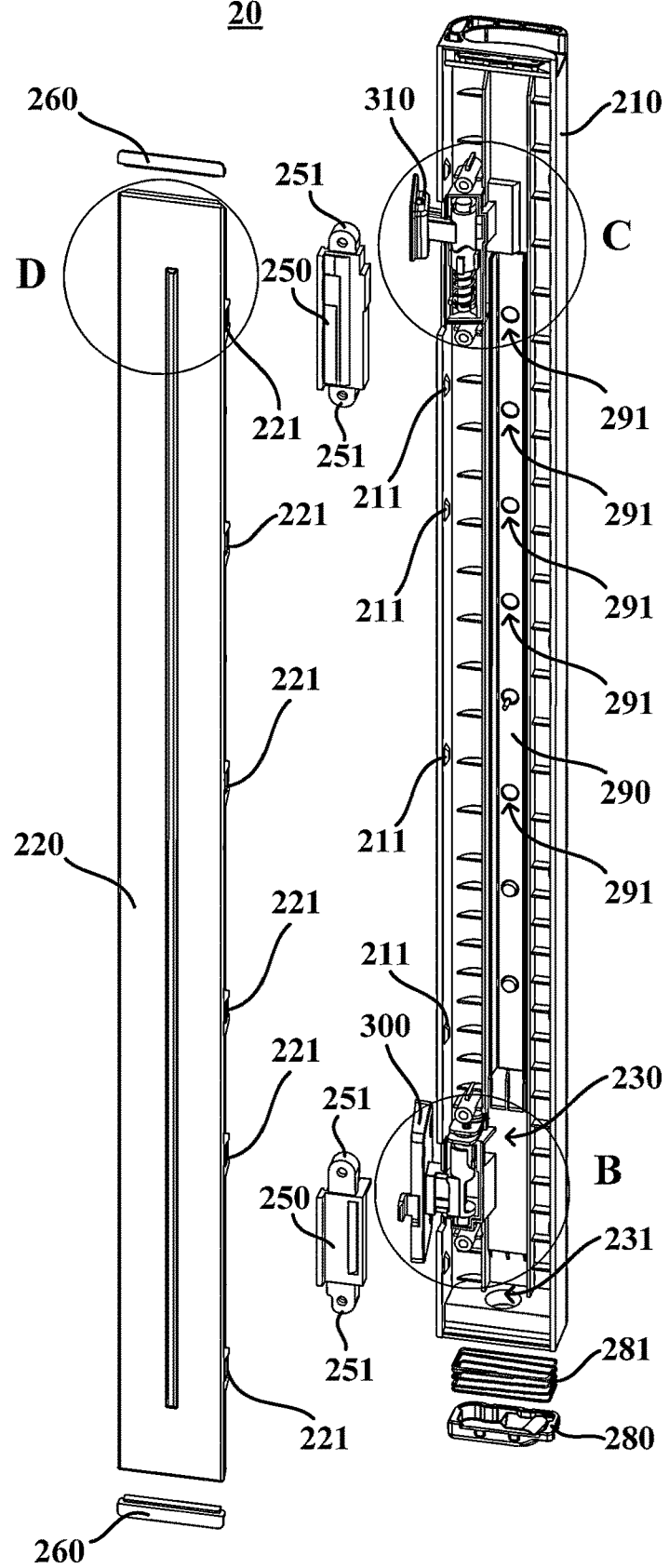
FIG. 4 is a schematic exploded view of a vertical beam assembly for refrigerator door according to one embodiment of the present invention.
Figure 5:
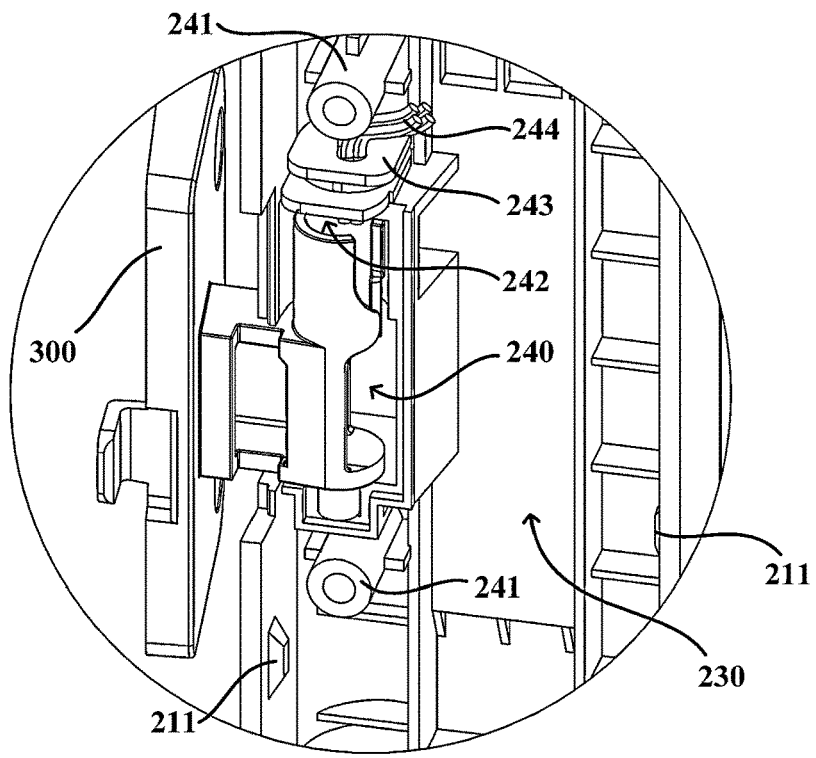
FIG. 5 is an enlarged view of a region B in FIG. 4.
Figure 6:
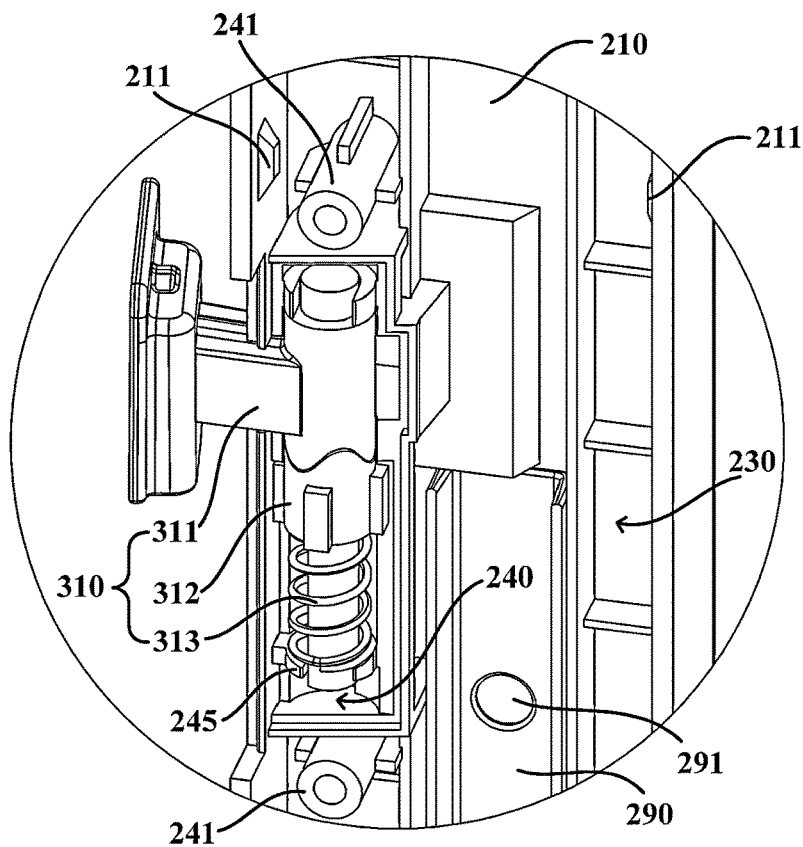
FIG. 6 is an enlarged view of a region C in FIG. 4.
Figure 7:
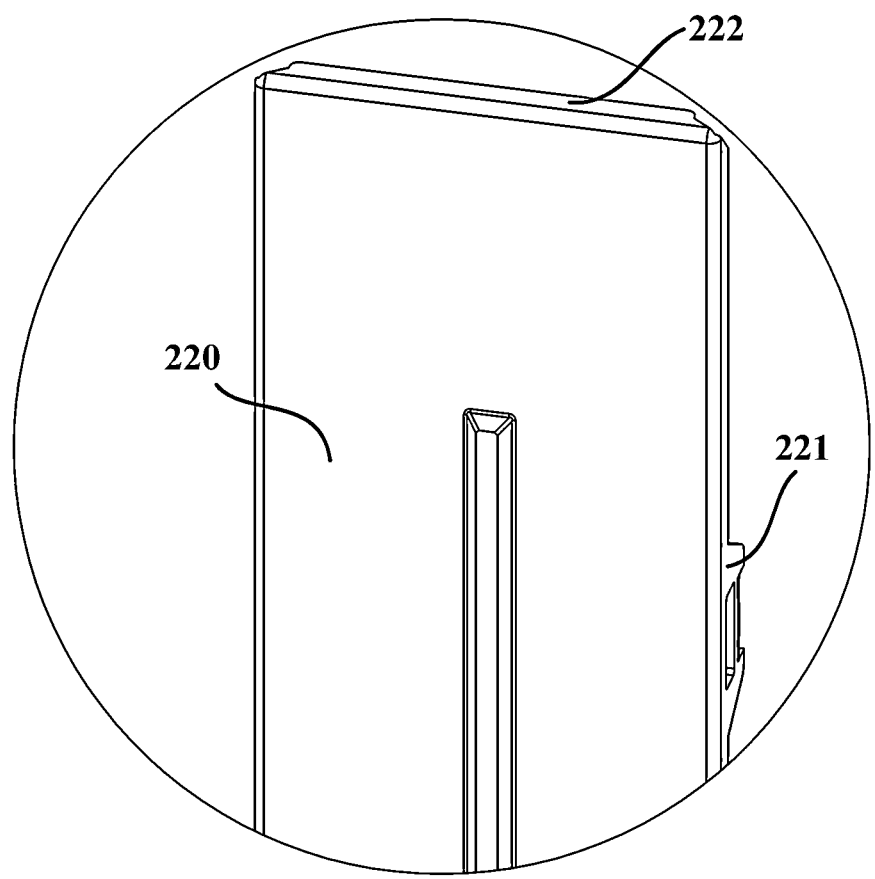
FIG. 7 is an enlarged view of a region D in FIG. 4.

FIG. 1 is a schematic structural view of a vertical beam assembly for refrigerator door 130 according to one embodiment of the present invention. FIG. 2 is an enlarged view of a region A in FIG. 1. FIG. 3 is a schematic exploded view of an end cap 280 and an elastic component 281 in FIG. 2. FIG. 4 is a schematic exploded view of a vertical beam assembly 20 for refrigerator door 130 according to one embodiment of the present invention. FIG. 5 is an enlarged view of a region B in FIG. 4. FIG. 6 is an enlarged view of a region C in FIG. 4. FIG. 7 is an enlarged view of a region D in FIG. 4.

As shown in FIGS. 1-7, the present embodiment provides a vertical beam assembly 20 for a refrigerator door 130. The vertical beam assembly 20 includes a vertical beam body 200, the vertical beam body 200 including a base shell 210 and a cover plate 220. The cover plate 220 is provided over the base shell 210 to form a foaming space 230 for filling with foaming material. Along the longitudinal direction of the base shell 210, the base shell 210 provides multiple receptacle cavities 240 near the side of the refrigerator door 130. Multiple sealing covers 250 are provided facing the cover plate 220 side and one-to-one correspondence with multiple receptacle cavities 240, to seal the openings from the receptacle cavities leading to the foaming space 230. The hinge assembly includes multiple hinges 300 mounted within the receptacle cavities 240 respectively, to rotatably connect the vertical beam body 200 to the refrigerator door 130.

In the present embodiment provides the vertical beam body 200 as a two-piece structure (including the base shell 210 and cover plate 220), and the cover plate 220 is provided over the base shell 210 to form a foaming space 230 for the foaming material. This not only ensures the thermal insulation performance of the vertical beam assembly 20 but also simplifies the structure of the vertical beam body 200, thereby reducing the production cost and installation complexity of the vertical beam assembly 20.

Furthermore, the present embodiment provides multiple receptacle cavities 240 on the base shell 210 and provides corresponding hinges 300 in each receptacle cavity 240, thus rotatably connect the vertical beam body to the refrigerator door, this ensures the normal turnable of the vertical beam body 200.

Furthermore, in the present embodiment, each receptacle cavity 240 facing the cover plate 220 side is provided with a corresponding sealing cover 250, sealing the openings leading to the foaming space 230. This prevents the foaming material from flowing into the receptacle cavities 240, avoiding interference with the hinges 300 installed in the receptacle cavities 240, and ensuring the normal operation of the hinge assembly and the turnable of the vertical beam assembly 20.

As illustrated, the embodiment provides two receptacle cavities 240 along the longitudinal direction of the vertical beam assembly 20 on the base shell 210, with two corresponding hinges 300 installed in these cavities respectively. The cooperative action of the two hinges 300 ensures the smooth turnable of the vertical beam assembly 20.

In other embodiment, the base shell 210 may provides three receptacle cavities 240 and three hinges 300, or four receptacle cavities 240 and four hinges 300. The more hinges 300 there are, the more securely the vertical beam assembly 20 is mounted on the door 130, but the larger the space occupied by the receptacle cavities 240 inside the vertical beam body 200 (thus reducing the foaming space 230 and the thermal insulation performance of the vertical beam assembly 20), and the higher the production cost. Therefore, the specific number of receptacle cavities 240 and hinges 300 can be set based on the length of the vertical beam assembly 20 and production costs.

As shown in FIGS. 4-6, both ends of every receptacle cavity 240 is provided with positioning parts 241, and both ends of every sealing cover 250 is provided with fixed parts 251 corresponding to the positioning parts 241. The positioning parts 241 and the fixed parts 251 are matched one-to-one for positioning and securing the multiple sealing covers 250.

The present embodiment provides positioning parts 241 at both ends of the receptacle cavity 240 and corresponding fixed parts 251 at both ends of the sealing cover 250. By matching the fixed parts 251 with the positioning parts 241, the sealing cover 250 is positioned. The positioning parts 241 and fixed parts 251 also lead to fix the sealing cover 250. In the present embodiment, both the positioning parts 241 and fixed parts 251 are provided with circular holes, and fastening screws (not shown in the figure) pass through the circular holes of the fixed parts 251 and positioning parts 241 to secure the fixed parts 251 and positioning parts 241 together. It should be understood that the fixed parts 251 and positioning parts 241 can also be secured together using other fasteners, such as fastening studs. In some embodiments, the positioning parts 241 and fixed parts 251 can also be secured together using adhesives such as glue.

In other embodiment, the fixed parts 251 may provide holes, and the positioning parts 241 may be shaped as cylindrical bodies that fit the shape and size of the holes on the fixed parts 251, allowing the positioning parts 241 to be inserted into the holes of the fixed parts 251 for positioning and securing the sealing cover 250.

In yet other embodiment, the fixed parts 251 may provide protrusions, and the positioning parts 241 may provide notches that fit the shape and size of the protrusions on the fixed parts 251, allowing the protrusions on the fixed parts 251 to be inserted into the notches on the positioning parts 241 for positioning and securing the sealing cover 250.

As shown in FIG. 5, one of the multiple receptacle cavities 240 provides a through hole 242 at one end for passing through a line 244 leading to the interior of the vertical beam body 200. A sealing ring 243 is provided at the through hole 242 and connected between the sealing cover 250 and the base shell 210, to seal the gap between the line 244 and the through hole 242.

In some preferred embodiments, the vertical beam body 200 may also be provided with electrical components such as heating wires or sensors, requiring the power line 244 to be introduced from the refrigerator door 130 into the vertical beam body 200 to power the electrical components inside the vertical beam body 200.

The present embodiment provides a through hole 242 at one end of the receptacle cavity 240, allowing the line 244 to pass through the hinge 300 on the refrigerator door 130, then through the through hole 242 at the end of the receptacle cavity 240 into the vertical beam body 200. This not only improves the safety of the line 244 but also enhances the aesthetics of the vertical beam assembly 20.

Furthermore, the present embodiment provides a sealing ring 243 at the through hole 242 at the end of the receptacle cavity 240 for passing through the line 244. The sealing ring 243 is connected between the sealing cover 250 and the base shell 210, scaling the gap between the through hole 242 at the end of the receptacle cavity 240 and the line 244. This ensures the seal between the receptacle cavity 240 and the foaming space 230, preventing the foaming material from flowing into the receptacle cavity 240 and affecting the normal rotation of the hinge 300 in the receptacle cavity 240. In some preferred embodiments, the sealing ring 243 can be made of elastic material (such as rubber) to better seal the gap between the line 244 and the through hole 242 of the receptacle cavity 240.

As shown in FIG. 6, the multiple hinges 300 include a limiting hinge 310. The limiting hinge 310 includes a first pivot component 311 installed within the receptacle cavity 240 and passing through the side wall of the base shell 210 to connect with the refrigerator door 130. The lower end surface of the first pivot component 311 forms a cam surface. A second pivot component 312 is slidably provided along the longitudinal direction of the vertical beam body 200 below the first pivot component 311, with an upper end surface that matches the cam surface of the first pivot component 311. One end of a spring 313 abutting against the bottom surface of the second pivot component 312, and the other end of the spring 313 abutting against a contact part 245 provided within the receptacle cavity 240.

The contact part 245 is configured as a semi-circular protrusion provided at the bottom end of the receptacle cavity 240, abutting against the spring 313, allowing the spring 313 to provide an upward force to the second pivot component 312 under compression. In other embodiment, the bottom end of the receptacle cavity 240 may not provide a contact part 245, allowing the compressed spring 313 to abut directly against the bottom end surface of the receptacle cavity 240.

When the door 130 opens, the vertical beam assembly 20a will form a certain turnable angle. If the turnable angle changes, it will cause the vertical beam assembly 20 to not turn normally during the closing process of the door 130, leading to the refrigerator door 130 not closing properly.

In the present embodiment, the lower end surface of the first pivot component 311 and the upper end surface of the second pivot component 312 located below the first pivot component 311 are wavy cam surfaces that match each other. When the first pivot component 311 rotates relative to the vertical beam body 200, the first pivot component 311 also slides relative to the second pivot component 312 along the cam surface, thereby driving the second pivot component 312 to move up and down along the longitudinal direction of the vertical beam body 200.

In the present embodiment, by providing a spring 313 below the second pivot component 312, applies an upward force on the second pivot component 312, enabling the second pivot component 312 to move upwards. This facilitates the sliding movement of the first pivot component 311 relative to the second pivot component 312 along the cam surface, and in turn, promotes the rotation of the first pivot component 311 relative to the vertical beam body 200.

In the present embodiment, by providing the cam surfaces of the first and second pivot components 311 and 312, along with the spring 313, there exists an effect of the spring force of the spring 313 and the effect of the special shape configuration of the cam face between the first pivot member 311 and the second pivot member 312, the design ensures that after the door 130 is opened, the vertical beam assembly 20 does not easily move relative to the door's movement or accidental touches by the user under. This avoids changes in the turnable angle of the vertical beam assembly 20 after the refrigerator door 130 is opened, thereby ensuring the normal opening and closing of the refrigerator door 130.

Additionally, when the door 130 of the refrigerator 10 is opened, the second pivot component 312 provides assistance for the relative rotation of the first pivot component 311 under the action of the spring 313 when the cam surfaces of the second pivot member 312 and the first pivot member 311 are not yet fully coincident, bringing the vertical beam body 200 closer to the door 130. When the refrigerator 10 is closed, the second pivot component 312 still provides assistance for the relative rotation of the first pivot component 311 under the action of the spring 313 when the cam surfaces of the second pivot member 312 and the first pivot member 311 are not yet fully coincident, bringing the vertical beam body 200 closer to the cabinet 100 of the refrigerator 10.

In the present embodiment, by providing a limiting hinge 310 in the hinge assembly, imposes a limitation on the vertical beam assembly 20, preventing arbitrary turnable of the vertical beam assembly 20 after the refrigerator door 130 is opened, thereby ensuring the normal opening and closing of the refrigerator door 130.

As shown in FIGS. 4 and 7, the cover plate 220 providing multiple snap fasteners 221 which extends on both sides towards the base shell 210. The side walls of the base shell 210 are correspondingly provided with multiple protrusions 211. Each of the snap fasteners 221 and protrusions 211 match one-to-one, securing the cover plate 220 to the base shell 210.

In the present embodiment, by providing multiple snap fasteners 221 at intervals on the cover plate 220 and corresponding protrusions 211 on the side walls of the base shell 210, utilizes the engagement of the snap fasteners 221 and protrusions 211 to fix the cover plate 220 to the base shell 210.

In other embodiment, protrusions 211 could be provided on the cover plate 220, and corresponding snap fasteners 221 on the side walls of the base shell 210, thereby fixing the cover plate 220 to the base shell 210. The specific setting method can be determined based on actual needs.

Figure 8:
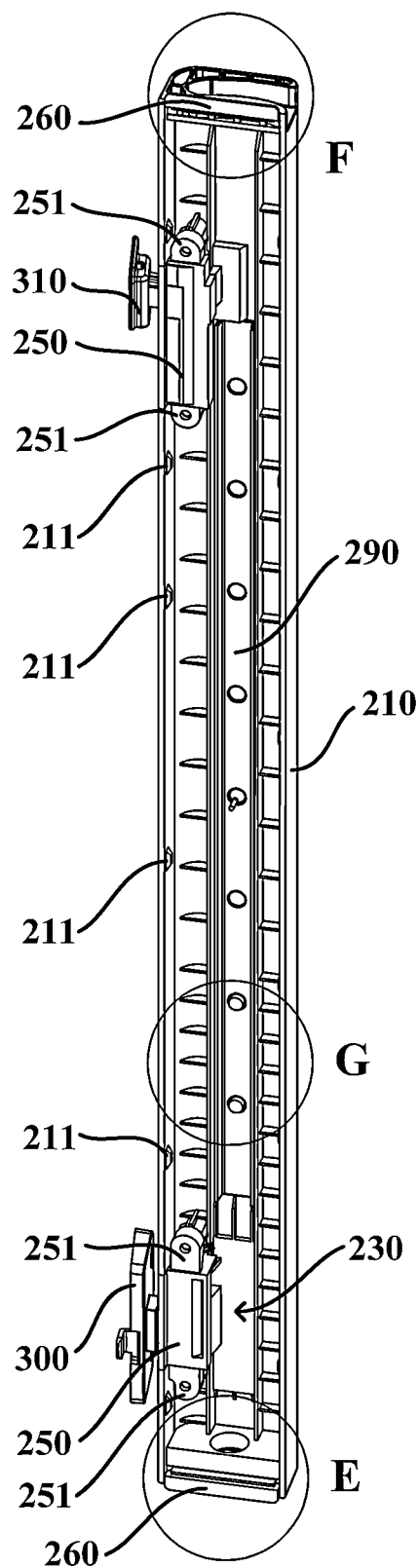
FIG. 8 is a schematic structural view of a vertical beam assembly for refrigerator door from another perspective according to one embodiment of the present invention.
Figure 9:
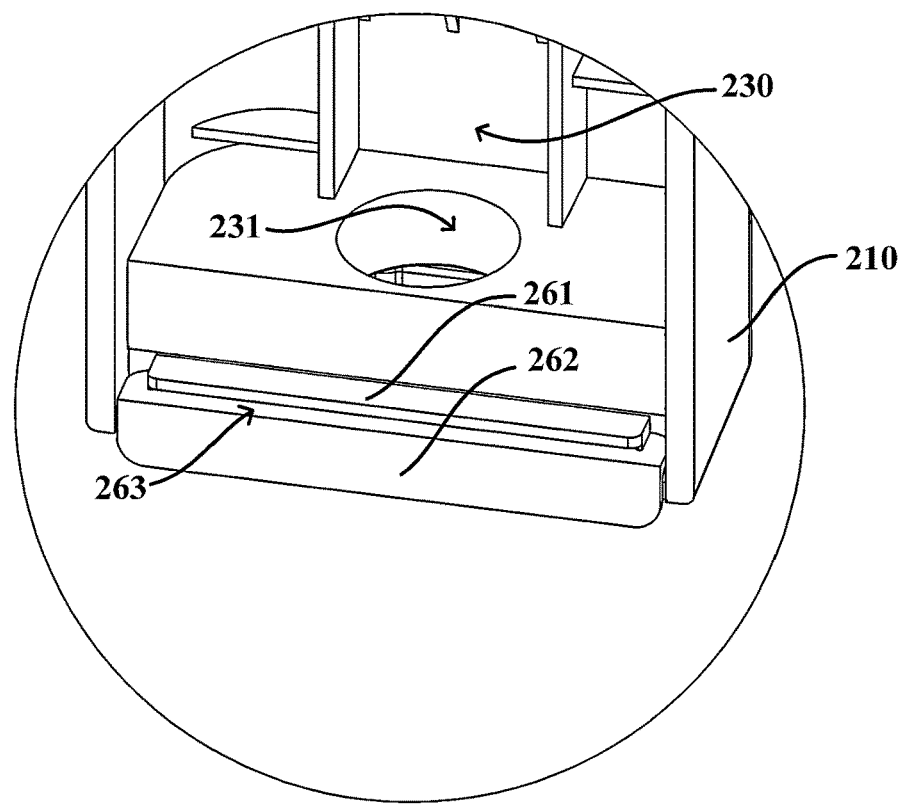
FIG. 9 is an enlarged view of a region E in FIG. 8.
Figure 10:
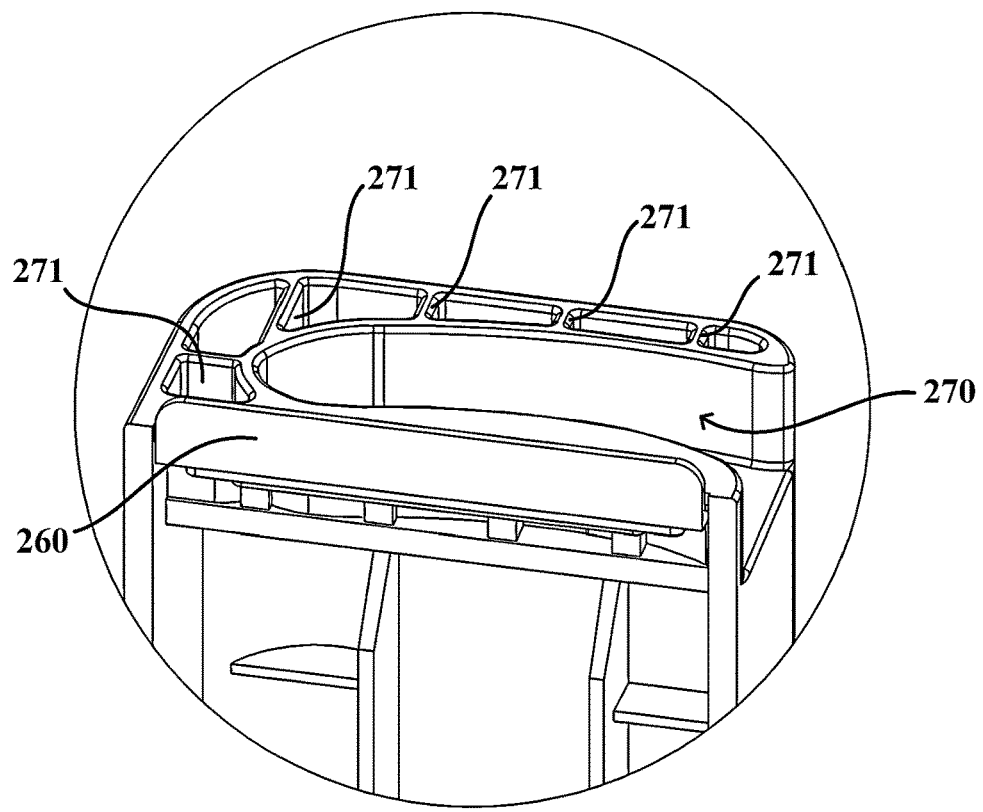
FIG. 10 is an enlarged view of a region F in FIG. 8.
Figure 11:
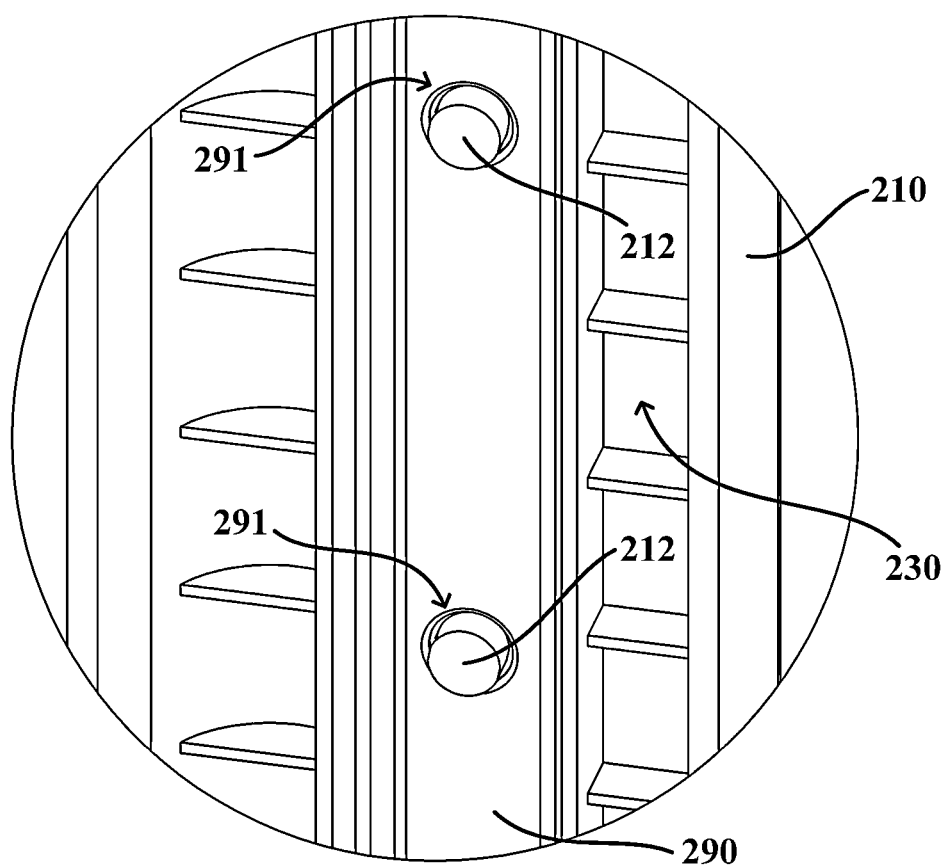
FIG. 11 is an enlarged view of a region G in FIG. 8.

FIG. 8 is a schematic structural view of a vertical beam assembly for refrigerator door from another perspective according to one embodiment of the present invention. FIG. 9 is an enlarged view of a region E in FIG. 8. FIG. 10 is an enlarged view of a region F in FIG. 8. FIG. 11 is an enlarged view of a region G in FIG. 8.

For better demonstration of the internal structure of the vertical beam body 200, the cover plate 220 is hidden in FIG. 8.

The vertical beam assembly 20 for the refrigerator door 130 also includes two sealing components 260, arranged at both ends of the vertical beam body 200 respectively, and connected between the base shell 210 and cover plate 220, to seal the gap between the base shell 210 and the cover plate 220.

In the present embodiment, by providing the sealing components 260 and positioning the sealing components 260 between the ends of the cover plate 220 and the base shell 210, seals the gap between the base shell 210 and the cover plate 220, enhancing the sealing performance of the vertical beam assembly 20.

As shown in FIG. 9, in the embodiment, each sealing component 260 includes a first plate part 261, abutting the end of the base shell 210; and a second plate part 262, extending from the first plate part 261 outside the end of the base shell 210, along the longitudinal direction of the vertical beam body 200. The first plate part 261 provides a slot 263, an opening of the slot 263 facing the cover plate 220, and both ends of the cover plate 220 provide flanges 222 that fit into the slot 263.

The first plate part 261 of the sealing component 260 is provided to abut the end of the base shell 210, sealing the gap between the cover plate 220 and the base shell 210. The first plate part 261 also provides a slot 263 for engaging the flange 222 of the cover plate 220, positioning and securing the cover plate 220. When the refrigerator door 130 is closed, the second plate parts 262 located at both ends of the vertical beam body 200 further seal the gap between the door 130 and the cabinet 100, improving the sealing effectiveness of the vertical beam assembly 20.

As shown in FIG. 10, the top end of the base shell 210 is provided with a guiding groove 270 for guiding the turnable of the vertical beam body 200. The groove walls of the guiding groove 270 are provided with rib plates 271 spaced around their outer perimeter, the rib plates 271 connected to the side walls of the base shell 210, to enhance the strength of the vertical beam body 200.

In the present embodiment, by providing the guiding groove 270 at the top end of the base shell 210, guides the turning of the vertical beam assembly 20 during the opening and closing process of the refrigerator door 130, ensuring the normal opening and closing of the door 130.

Furthermore, In the present embodiment, by providing rib plates 271 spaced around the outer perimeter of the groove walls of the guiding groove 270, and connecting the rib plates 271 to the side walls of the base shell 210, enhances the strength of the vertical beam body 200. Additionally, the spaced arrangement of the rib plates 271 accelerates the cooling speed of the top end of the base shell 210 during the manufacturing process, thereby avoiding local overheating or slow cooling that could cause material deformation (such as shrinkage), improving production quality and reducing production losses.

The bottom end of the base shell 210 is also provided with an injection hole 231 for injecting foaming material into the foaming space 230.

In the present embodiment, by providing the injection hole 231 at the bottom end of the base shell 210, not only facilitates the injection of foaming material into the foaming space 230 but also provides an aesthetically pleasing structure, enhancing the appearance of the vertical beam assembly 20.

In some preferred embodiments, the vertical beam assembly 20 adopts a closed-mold foaming method. After the cover plate 220 and base shell 210 are snapped together to form a sealed foaming space 230, foaming material is injected into the foaming space 230 through the injection hole 231 located at the bottom end of the base shell 210, ensuring that no overflow occurs during the foaming process.

The vertical beam assembly 20 for the refrigerator door 130 also includes an end cover 280, extendably provided at the bottom end of the base shell 210, and an elastic component 281, provided between the base shell 210 and the end cover 280, one end of the elastic component 281 abutting the end of the base shell 210, and the other end of the elastic component 281 against the end cover 280.

In some preferred embodiments, the elastic component 281 can be a compression spring, providing a downward force to the end cover 280.

In the present embodiment, an extendable end cover 280 is also provided at the bottom end of the base shell 210. On the one hand, it conceals the injection hole 231, enhancing the aesthetics of the vertical beam assembly 20, and on the other hand, the extendable component contacts the cabinet 100 of the refrigerator 10, thereby improving the seal between the vertical beam assembly 20 and the cabinet 100 of the refrigerator 10.

In some preferred embodiments, the vertical beam assembly 20 for the refrigerator door 130 also includes a reinforcement plate 290, fixed on the side wall of the base shell 210 parallel to the cover plate 220 using positioning columns 212 on the base shell 210, to enhance the strength of the base shell 210.

As shown in FIG. 11, the reinforcement plate 290 provides multiple holes 291, and the side wall of the base shell 210 parallel to the cover plate 220 provides two positioning columns 212 that fit the shape and size of the holes 291 on the reinforcement plate 290. The positioning columns 212 on the base shell 210 fit into two of the holes 291 on the reinforcement plate 290, positioning and securing the reinforcement plate 290, thereby enhancing the strength of the base shell 210. Additionally, the multiple holes 291 provided on the reinforcement plate 290 reduce the material of the reinforcement plate 290, thereby lowering production costs. Furthermore, the arrangement of the multiple holes 291 on the reinforcement plate 290 allows the reinforcement plate 290 to better adhere to the side walls of the base shell 210 under the pressure of the foaming material in the foaming space 230 after the foaming material filling is complete, thereby further enhancing the strength of the base shell 210.

Figure 12:
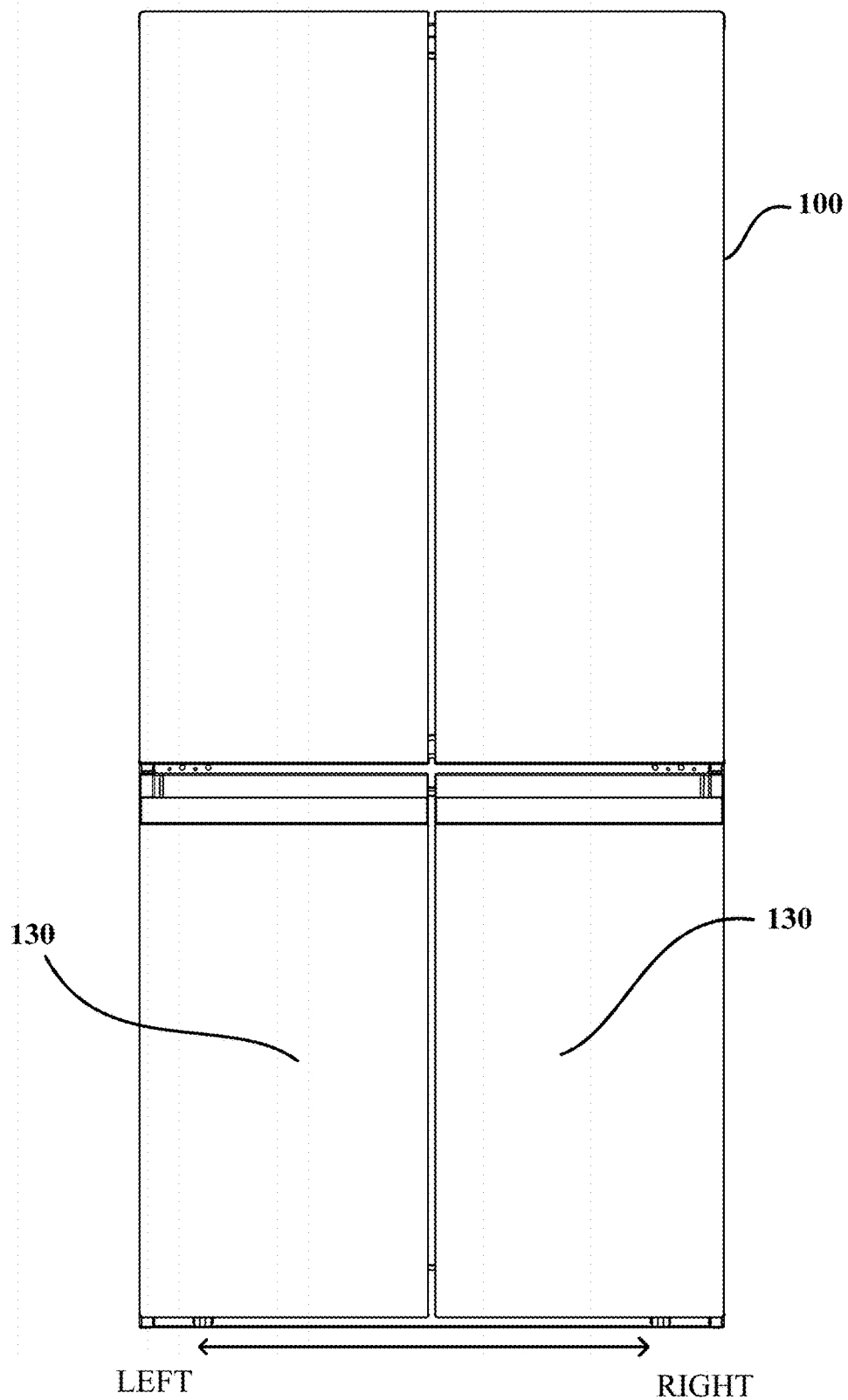
FIG. 12 is a schematic structural view of a refrigerator according to one embodiment of the present invention.

As shown in FIG. 12, the present embodiment also provides a refrigerator 10, comprising the aforementioned vertical beam assembly 20 for the refrigerator door 130, where the vertical beam assembly 20 is configured to be installed on the door 130 of the freezing compartment 120 of the refrigerator 10.

Figure 13:
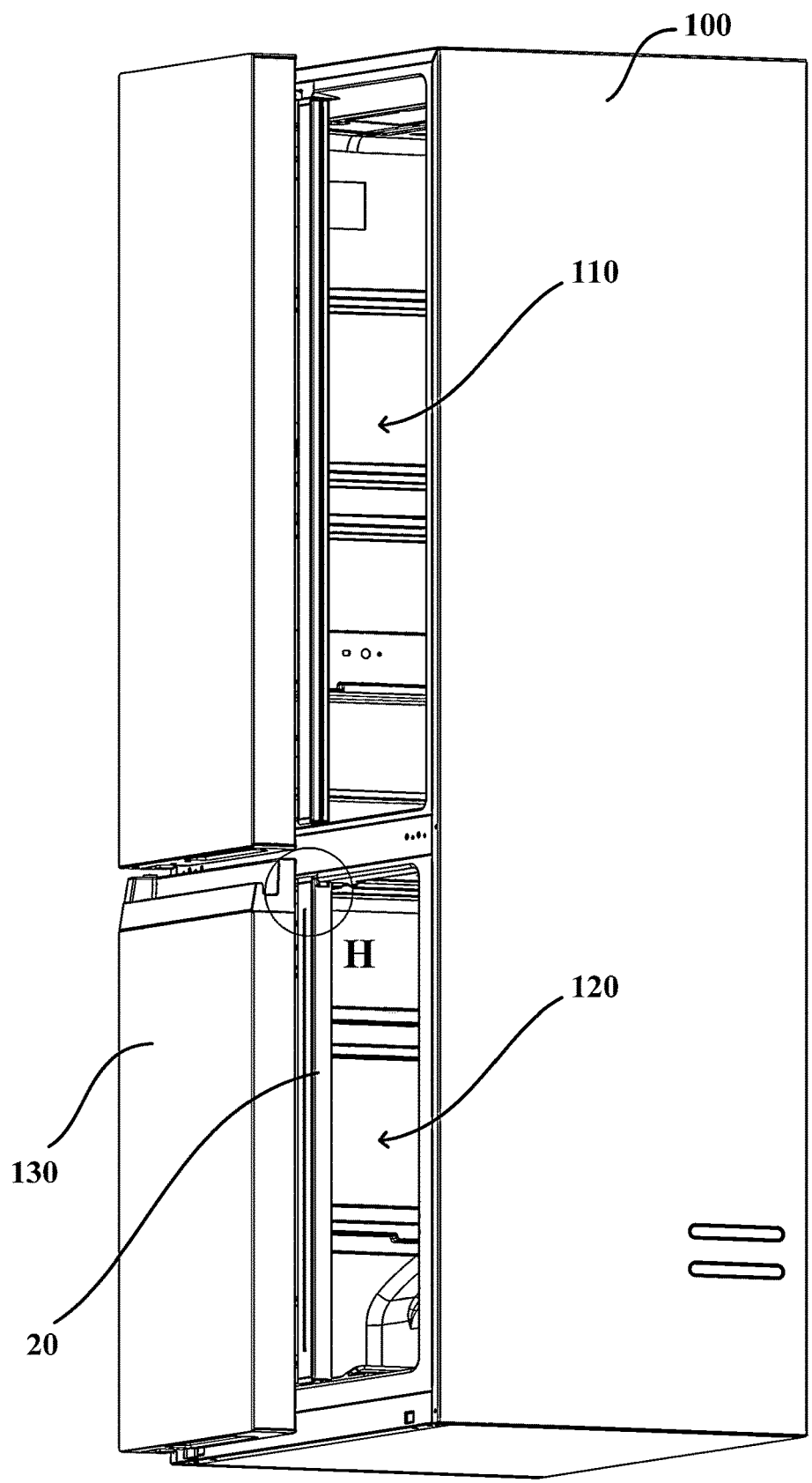
FIG. 13 is a schematic structural view of a refrigerator door according to one embodiment of the present invention when the door is in a closed state.

As shown in FIG. 13, the refrigerator 10 of the present embodiment includes a cabinet 100, the cabinet 100 providing upper and lower distributed refrigerating compartment 110 and freezing compartment 120, each with a front opening. Both the refrigerating compartment 110 and freezing compartment 120 are provided with two opposing doors 130. The vertical beam assembly 20 is configured to be installed on the door 130 of the freezing compartment 120 of the refrigerator 10. It is understood that the vertical beam assembly 20 can be provided on any door 130 of the freezing compartment 120 of the refrigerator 10, with the specific installation position being determined based on actual needs.

In some preferred embodiments, the vertical beam assembly 20 is installed on one of the doors 130 on the left side of the freezing compartment 120 of the refrigerator 10, scaling the gap between the two doors 130 and the cabinet 100 when the door 130 is closed. When the refrigerator door 130 is in the closed state, the base shell 210 of the vertical beam assembly 20 is closer to the interior of the freezing compartment 120 of the refrigerator 10, while the cover plate 220 is on the side farther from the refrigerator 10.

Figure 14:
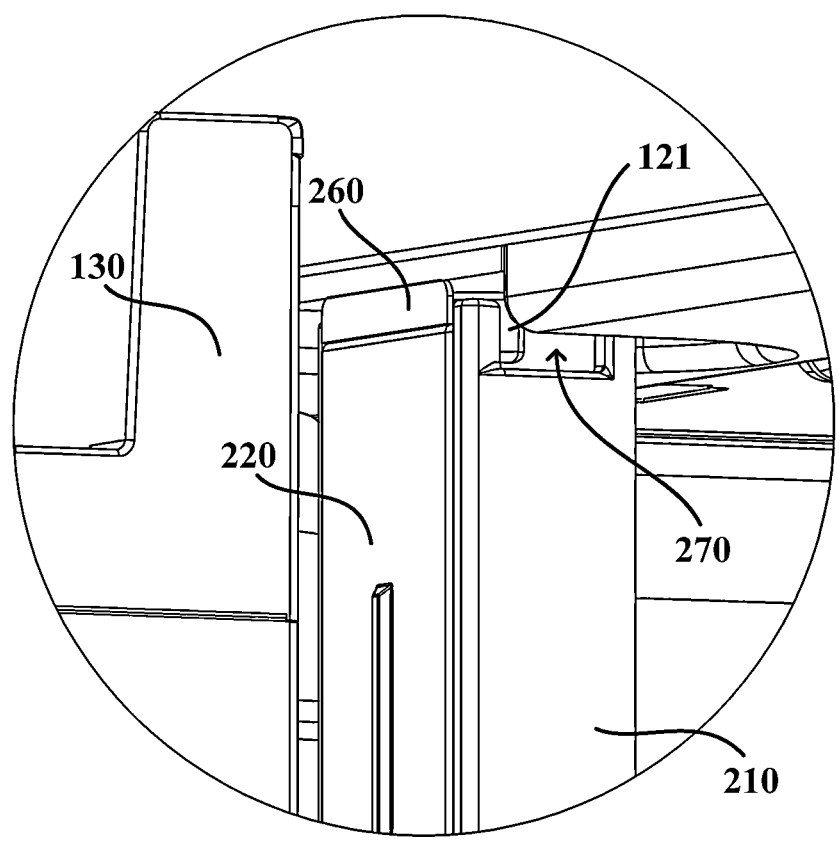
FIG. 14 is an enlarged view of a region H in FIG. 13.

As shown in FIG. 14, the cabinet 100 of the refrigerator 10 provides a guiding protrusion 121 arranged at a position opposite the guiding groove 270. During the opening and closing process of the door 130 of the refrigerator 10, the guiding protrusion 121 moves within the guiding groove 270, driven by the movement of the door 130. The guiding protrusion 121 and guiding groove 270 cooperate to guide the rotation of the guiding groove 270, thereby driving the turning of the vertical beam assembly 20.

In the present embodiment, by providing two opposing doors 130 at the freezing compartment 120 of the refrigerator 10 and installing a turnable vertical beam assembly 20 on one of the doors 130, ensures the sealing of the freezing compartment 120 while lifting the size restrictions on stored items in the freezing compartment 120. This meets the user's needs for storing large food items and enhances the space utilization of the freezing compartment 120, thereby improving the user experience.

Furthermore, In the present embodiment, by providing the vertical beam assembly 20 installed on the door 130 of the freezing compartment 120 as a two-piece vertical beam assembly 20 (comprising of the base shell 210 and cover plate 220), not only ensures the thermal insulation performance of the vertical beam assembly 20 but also simplifies the structure of the vertical beam body 200. This, in turn, reduces the production cost and installation complexity of the vertical beam assembly 20.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from contents disclosed in the present invention. Therefore, the scope of the present invention should be understood and recognized as covering all these other variations or modifications.

What is claimed is:

1. A vertical beam assembly for a refrigerator door, comprising:
   a vertical beam body, comprises a base shell and a cover plate, the cover plate is provided over the base shell to form a foaming space for filling with foaming material;
   wherein the base shell provides multiple receptacle cavities along a longitudinal direction near the side of the refrigerator door, multiple sealing covers are provided at the multiple receptacle cavities facing the cover plate side and one-to-one correspondence with the multiple receptacle cavities, sealing openings from the receptacle cavities leading to the foaming space;

a hinge assembly, comprises multiple hinges mounted within the receptacle cavities respectively, to rotatably connect the vertical beam body to the refrigerator door;

wherein the multiple hinges comprise a limiting hinge, the limiting hinge comprising:

a first pivot component, mounted within one receptacle cavity and passing through the side wall of the base shell to connect with the refrigerator door, where the lower end surface of the first pivot component forms a cam surface;

a second pivot component is configured to slidably along the longitudinal direction of the vertical beam body below the first pivot component, the second pivot component is provided with an upper end surface that matches the cam surface of the first pivot component;

a spring, one end abutting against the bottom surface of the second pivot component and the other end abutting against a contact portion provided within the receptacle cavity.

2. The vertical beam assembly for a refrigerator door according to claim 1, wherein both ends of every receptacle cavity is provided with positioning portions respectively, and both ends of every sealing cover is provided with fixed parts corresponding to the positioning parts respectively, the positioning parts and the fixed parts are matched one-to-one for positioning and securing the multiple sealing covers.

3. The vertical beam assembly for a refrigerator door according to claim 1, wherein:

one of the multiple receptacle cavities is provided with a through hole at one end for passing through a line leading to the interior of the vertical beam body, a sealing ring is provided at the through hole and connected between the sealing cover and the base shell, to seal the gap between the line and the through hole.

4. The vertical beam assembly for a refrigerator door according to claim 1, wherein:

both sides of the cover plate extend towards the base shell forming multiple snap fasteners, and the side walls of the base shell are correspondingly provided with multiple protrusions, each of the snap fasteners and protrusions match one-to-one, securing the cover plate to the base shell.

5. The vertical beam assembly for a refrigerator door according to claim 1, further comprising:

two sealing components, each provided at both ends of the vertical beam body, and connected between the base shell and the cover plate, to seal the gap between the base shell and the cover plate.

6. The vertical beam assembly for a refrigerator door according to claim 1, wherein:

the top end of the base shell is provided with a guiding groove for guiding the rotation of the vertical beam body, wherein the groove walls of the guiding groove are provided with rib plates spaced around their outer perimeter, the rib plates are connected to the side walls of the base shell, to enhance the strength of the vertical beam body.

7. The vertical beam assembly for a refrigerator door according to claim 1, wherein:

the bottom end of the base shell is also provided with an injection hole for injecting the foaming material into the foaming space.

8. The vertical beam assembly for a refrigerator door according to claim 1, further comprising:

an end cover, configured to extendably provided at the bottom end of the base shell;

an elastic component, provided between the base shell and the end cover, one end abutting against the end of the base shell, and the other end against the end cover.

9. A refrigerator, comprising:

the vertical beam assembly for a refrigerator door according to claim 1, where the vertical beam assembly is configured to be mounted on the door of the freezing compartment of the refrigerator.

* * * * *